United States Patent
Marutzky (10) Patent No.: US 12,428,162 B2
(45) Date of Patent: Sep. 30, 2025

(54) MOTION CONTROL SYSTEM FOR AN AIRCRAFT SEAT

(71) Applicant: AMI Industries, Inc., Colorado Springs, CO (US)

(72) Inventor: Kyler J. Marutzky, Colorado Springs, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 285 days.

(21) Appl. No.: 18/218,404

(22) Filed: Jul. 5, 2023

(65) Prior Publication Data

US 2024/0025547 A1     Jan. 25, 2024

Related U.S. Application Data

(60) Provisional application No. 63/392,006, filed on Jul. 25, 2022.

(51) Int. Cl.
    *B64D 11/06*      (2006.01)

(52) U.S. Cl.
    CPC ................. *B64D 11/064* (2014.12)

(58) Field of Classification Search
    CPC .......... B64D 11/064; B64D 11/0639
    See application file for complete search history.

(56) References Cited

U.S. PATENT DOCUMENTS

| | | | |
|---|---|---|---|
| 2,519,963 A | 8/1950 | Heffernan et al. | |
| 4,157,797 A | 6/1979 | Fox | |
| 4,354,398 A * | 10/1982 | Porter | B60N 2/231 |
| | | | 74/502 |
| 4,901,594 A * | 2/1990 | Selzer | A47C 1/0244 |
| | | | 267/64.11 |
| 5,161,765 A | 11/1992 | Wilson | |
| 5,871,318 A | 2/1999 | Dixon et al. | |
| 7,182,402 B1 * | 2/2007 | Ahad | B64D 11/064 |
| | | | 297/354.12 |

(Continued)

FOREIGN PATENT DOCUMENTS

| | | |
|---|---|---|
| GB | 2426549 B | 3/2010 |
| JP | 2012116209 A | 6/2012 |

(Continued)

OTHER PUBLICATIONS

Extended European Search Report dated Nov. 30, 2023; European Application No. 23186990.0.

*Primary Examiner* — Philip F Gabler
(74) *Attorney, Agent, or Firm* — Suiter Swantz IP (57) ABSTRACT

An aircraft seat may include an integrated motion control system. The motion control system may include one or more user controlled sub-systems. Each sub-system may include at least one of a user control device, a lever arm, and a metering pin assembly. The lever arm may couple to the user control device and synchronously transmit a force to one or more cables in response to an actuation of the user control device. The metering pin assembly may include a metering pin which may be configured to attach to an end portion of the one or more cables and receive a force from the one or more cables causing the respective control sub-system to execute an adjustment control operation. The adjustment control operation may include a vertical position adjustment, a swivel position adjustment, or a track position adjustment.

20 Claims, 11 Drawing Sheets

(56) References Cited

U.S. PATENT DOCUMENTS

| | | | |
|---|---|---|---|
| 7,637,705 B2 | 12/2009 | Girardin et al. | |
| 8,920,085 B2 | 12/2014 | Hudson et al. | |
| 9,919,624 B2 | 3/2018 | Cziomer et al. | |
| 10,005,558 B2 | 6/2018 | Cailleteau | |
| 10,279,917 B1 * | 5/2019 | Wilkey | B60N 2/231 |
| 10,507,748 B2 | 12/2019 | Watanabe | |
| 10,569,669 B2 | 2/2020 | Dry et al. | |
| 10,604,048 B2 * | 3/2020 | Vela | B60N 2/231 |
| 10,696,191 B2 * | 6/2020 | Does | F16H 21/44 |
| 10,787,263 B2 | 9/2020 | Jacobson et al. | |
| 10,829,225 B2 | 11/2020 | Doughty et al. | |
| 2018/0290751 A1 | 10/2018 | Emrich et al. | |
| 2019/0345963 A1 | 11/2019 | Mochizuki et al. | |
| 2020/0039651 A1 | 2/2020 | Oleson et al. | |
| 2020/0247546 A1 * | 8/2020 | Wong | B64D 11/0647 |
| 2021/0261170 A1 | 8/2021 | Moulin | |
| 2021/0331608 A1 | 10/2021 | Tanaka et al. | |
| 2022/0032821 A1 | 2/2022 | Parker et al. | |
| 2022/0169392 A1 * | 6/2022 | Hontz | B60N 3/004 |

FOREIGN PATENT DOCUMENTS

| | | |
|---|---|---|
| KR | 19990020423 U | 6/1999 |
| WO | 2013081630 A1 | 6/2013 |

\* cited by examiner

MOTION CONTROL SYSTEM FOR AN AIRCRAFT SEAT

CROSS-REFERENCE TO RELATED APPLICATION

The present application claims the benefit under 35 U.S.C. § 119(e) of U.S. Provisional Application Ser. No. 63/392,006, filed Jul. 25, 2022, which is incorporated herein by reference in the entirety.

TECHNICAL FIELD

The present invention generally relates to motion control systems, and, more particularly, to a motion control system for an aircraft seat.

BACKGROUND

Modern aircraft seats are typically equipped with adjustable seating systems which may be configured for adjustment of the aircraft seat based on a user preference. For example, a passenger or a crew member may desire for their respective aircraft seat to include adjustable features related to at least one of a vertical height, a tracking position, or a swivel position. However, such adjustable seating systems often include numerous parts, bulky components, and are difficult to access (e.g., not visible or positioned in an area that is hard to reach). Therefore, it would be advantageous to provide a system which cures one or more of the shortcomings described above.

SUMMARY

A motion control system is disclosed, in accordance with one or more embodiments of the present disclosure. In some embodiments, the motion control system includes one or more control sub-systems. In some embodiments, the one or more control sub-systems include a user control device. In some embodiments, the one or more control sub-systems include a lever arm coupled to the user control device, the lever arm is configured to synchronously transmit a force to one or more cables in response to an actuation of the user control device. In some embodiments, the one or more control sub-systems include a metering pin assembly, the metering pin assembly including a metering pin, the metering pin configured to attach to an end portion of one or more cables and receive a force from the one or more cables causing the respective control sub-system to execute an adjustment control operation.

In some embodiments, an aircraft seating system is disclosed in accordance with one or more embodiments of the present disclosure. In some embodiments, the aircraft seating system includes an aircraft seat having at least one of a seat frame, a seatback structure and a seat pan structure. In some embodiments, the aircraft seating system may include one or more control sub-systems. In some embodiments, the one or more control sub-systems include a user control device. In some embodiments, the one or more control sub-systems include a lever arm coupled to the user control device, the lever arm is configured to synchronously transmit a force to one or more cables in response to an actuation of the user control device. In some embodiments, the one or more control sub-systems include a metering pin assembly, the metering pin assembly including a metering pin, the metering pin configured to attach to an end portion of one or more cables and receive a force from the one or more cables causing the respective control sub-system to execute an adjustment control operation.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of or sub-combination of two or more such features, along with any other features which may not necessarily be expressly described or inherently present in the instant disclosure.

Figure 1A:
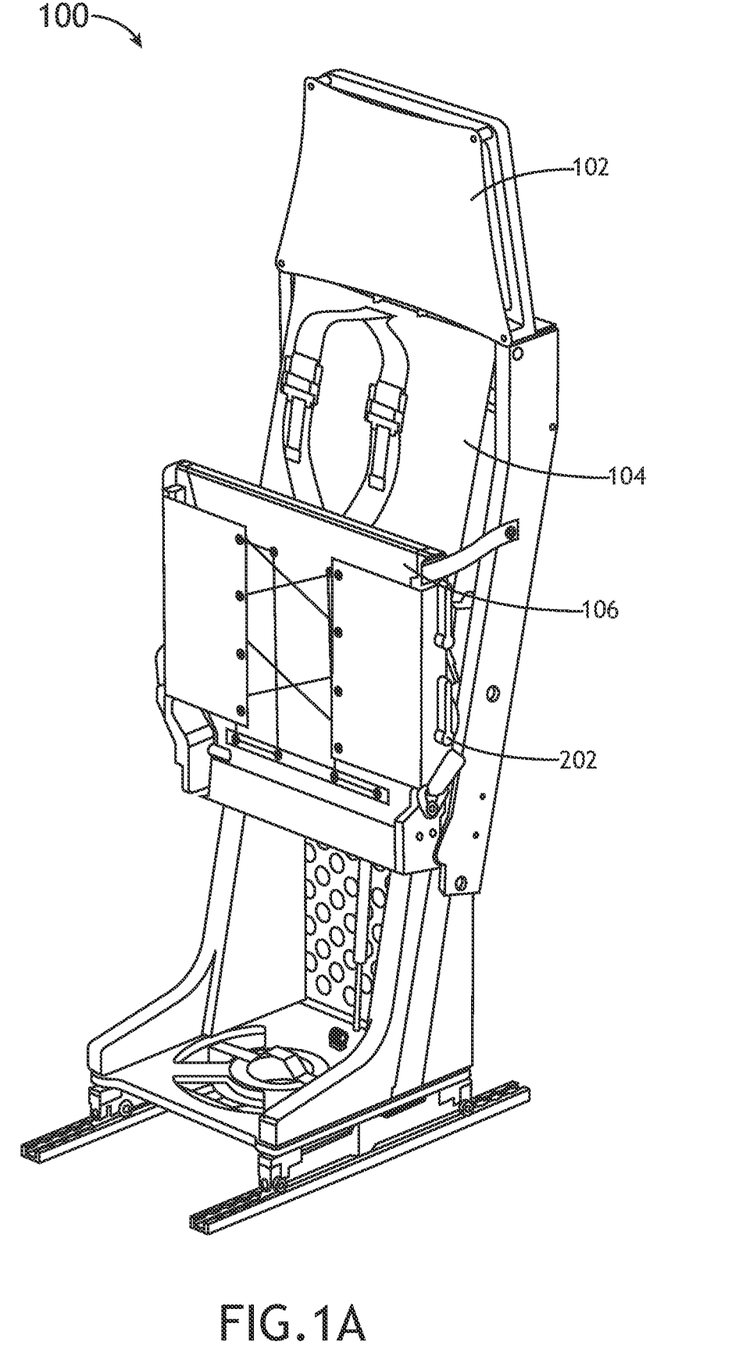
FIG. 1A illustrates a perspective view of a motion control system integrated into an aircraft seat with a seat pan in a stowed configuration, in accordance with one or more embodiments of the disclosure.

Referring to FIG. 1, a perspective view of a motion control system 200 integrated into an aircraft seat 100 with a seat pan in a stowed configuration is illustrated, in accordance with one or more embodiments of the disclosure. The aircraft seat 100 may include a seat frame, a seatpan 106, a seatback 104, one or more armrests, a headrest 102, and/or one or more motion control sub-systems 200. It is noted herein that the aircraft seat 100 depicted in the figures is not limited to the specific structures or features shown, however, the aircraft seat 100 is illustrated with an intent to exemplify how the system would integrate within an aircraft seat 100. It is further noted that the motion control system 200 may be configured to integrate with any aircraft seat type known in the art.

Aircraft seats installed within an avionics environment may be configured in accordance with aviation guidelines and/or standards put forth by, but not limited to, the Federal Aviation Administration (FAA), the European Aviation Safety Agency (EASA) or any other flight certification agency or organization; the American National Standards Institute (ANSI), Aeronautical Radio, Incorporated (ARINC), the Society of Automotive Engineers (SAE), or any other standards setting organization or company; the Radio Technical Commission for Aeronautics (RTCA) or any other guidelines agency or organization; or the like.

Figure 1B:
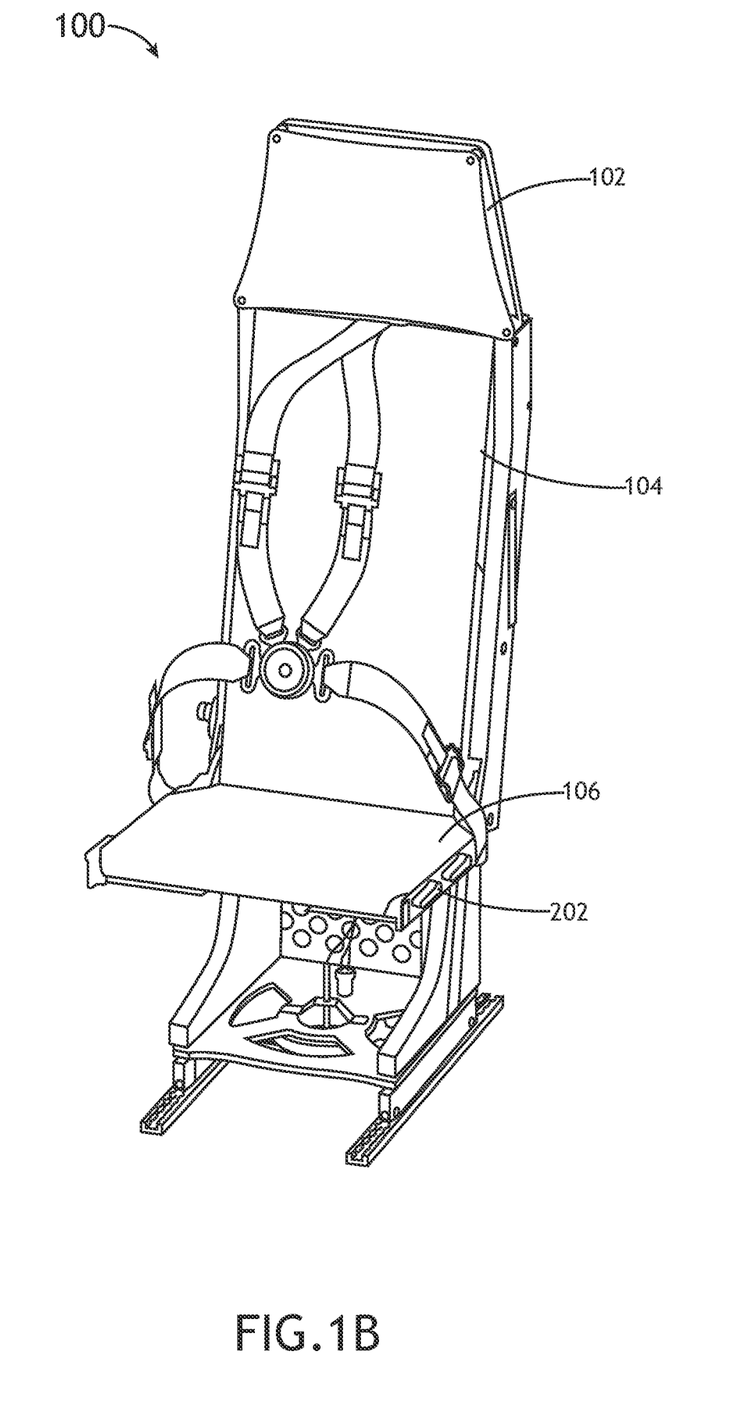
FIG. 1B illustrates a perspective view of a motion control system integrated into an aircraft seat with a seat pan in a deployed configuration, in accordance with one or more embodiments of the disclosure.

Broadly speaking, the aircraft seat 100 incorporates a low-profile motion control system 200 that maintains, with minimal added weight and complexity, the one or more user controlled sub-systems at ergonomically optimal positions (e.g., on at least one side portion of the seatpan 106) on the aircraft seat 100. For example, the system should accommodate a fifth percentile female, as well as, a ninety-fifth percentile male and be configured to fit within a low-profile seat. In some embodiments, the motion control system 200 may be configured to integrate within an aircraft seat 100 having a stowable seat pan. For example, the seat pan may be configured to transition from a stowed configuration shown by FIG. 1 to a deployed configuration (e.g., near horizontal) as shown by FIG. 2, without interfering or removing the motion control system 200.

Figure 1C:
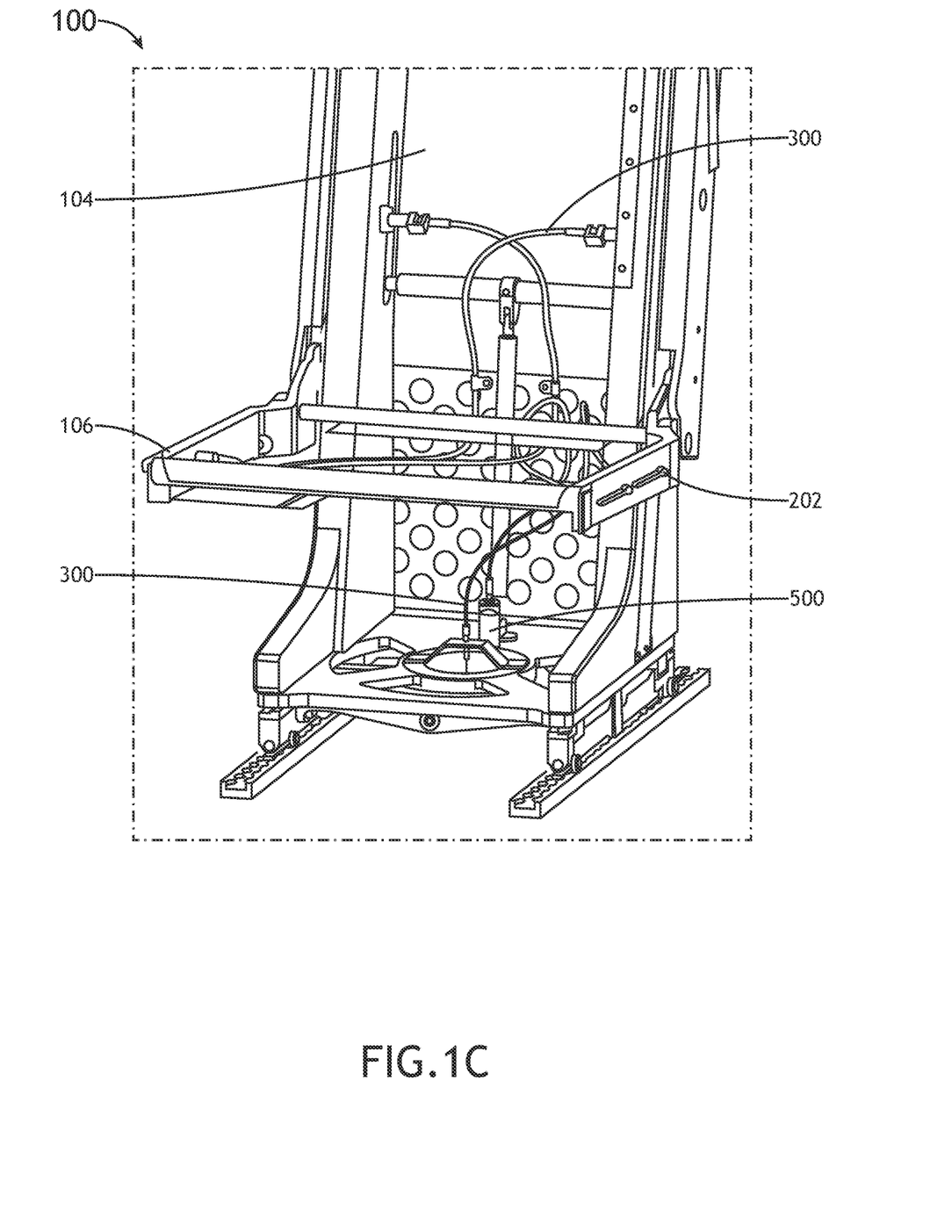
FIG. 1C illustrates a perspective view of a motion control system integrated into an aircraft seat, in accordance with one or more embodiments of the disclosure.

In some embodiments, referring now to FIG. 1C, the motion control system 200 may include one or more user controlled sub-systems configured to couple to the aircraft seat 100. For example, the one or more user controlled sub-systems may include at least one of a vertical adjustment control sub-system, a track adjustment control sub-system, and/or a swivel adjustment control sub-system. In embodiments, the vertical adjustment control sub-system may allow a user to adjust a vertical position of the aircraft seat 100 or seatpan 106; the track adjustment control sub-system may allow a user to adjust a track position of the aircraft seat 100; and the swivel adjustment control sub-system may allow a user to adjust a swivel position of the aircraft seat 100. By way of another example, each of the one or more user controlled sub-systems may include at least one of a user control device 202, a cable assembly, a lever arm 206, and a metering pin assembly 500.

In some embodiments, the seat frame may be fixed to the floor of a passenger cabin (e.g., set by track fittings into one or more tracks extending through a passenger cabin). In some embodiments, the seat frame may be attached to the cabin floor (e.g., set into the track fittings) by one or more additional mechanisms allowing the seat frame to translate (e.g., laterally and/or longitudinally) and/or rotate (e.g., swivel) relative to the cabin floor. In either case, the movement of the seatpan 106, seatback 104, and/or headrest 102 relative to the seat frame is unaffected.

In some embodiments, one or more components of the one or more user controlled sub-systems may be coupled to the aircraft seat 100. For example, the one or more cable assemblies shown in FIG. 1C may be fixed to the seat frame via one or more attachment devices (e.g., brackets, fasteners, or the like). The one or more cables 300 may be fixed to a bottom portion of the seat frame and the one or more cables 300 may be coupled to a portion of the seat frame which supports the seat back. It is noted herein that the routing of the one or more cables 300 are not limited to the paths shown in FIG. 1C. By way of another example, the metering pin assembly 500 may be configured to attach to a bottom portion of the seat frame, as shown in FIG. 1C. By way of another example, the user control device 202 (e.g., handle) may be configured to couple to a side portion of the seatpan 106. The user control device 202 may be positioned such that it is within the reach of the user (e.g., accessible by a $5^{th}$ percentile female up to a $95^{th}$ percentile male).

Figure 2:
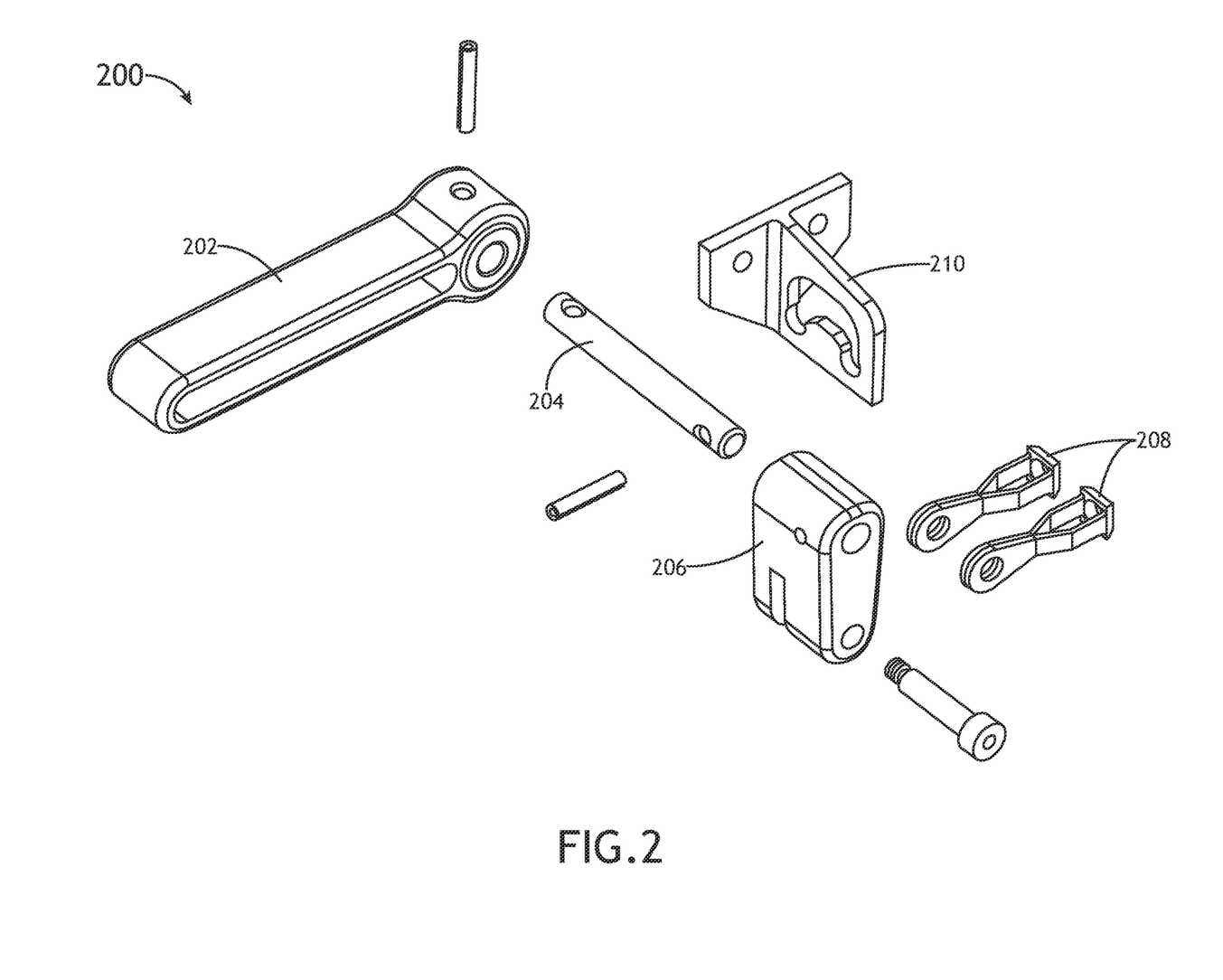
FIG. 2 illustrates an exploded view of a modular user controlled sub-system, in accordance with one or more embodiments of the disclosure.

FIG. 2 illustrates an exploded view of the one or more modular user controlled sub-systems, in accordance with one or more embodiments of the disclosure. The one or more user controlled sub-systems may include at least one of a user control device 202 (e.g., handle, or the like), a torsion dowel 204, a lever arm 206, one or more cable fittings 208, and/or a cable bracket 210. It is noted herein that each of the one or more user controlled sub-systems may include, but are not limited to, the same components used throughout.

In embodiments, the torsion dowel 204 may be configured to couple the lever arm 206 to the user control device 202 (e.g., handle). For example, the torsion dowel 204 may be inserted within a cavity of the user control device 202 and the lever arm 206. The torsion dowel 204 may include one or more holes which are configured to align with one or more holes of the user control device 202 and the lever arm 206. Once the holes are in alignment, a pin may be inserted through the aligned one or more holes connecting the user control device 202 to the lever arm 206 via the torsion dowel 204. Further, the torsion dowel 204 may be configured to apply a torque force on the lever arm 206 in response to an actuation of the user control device 202 (e.g., by a user). In embodiments, the lever arm 206 may be configured to attach to one or more cable end fittings 208. For example, the one or more cable end fittings 208 may include a hole used for attaching to the lever arm 206. By way of another example, the lever arm 206 may include at least one slot and at least one hole which may be configured to receive and couple with the one or more cable fittings 208 via one or more fasteners (e.g., pin, screw, threaded screw, or any other like fastening device known in the art), as shown in FIG. 2.

Figure 3:
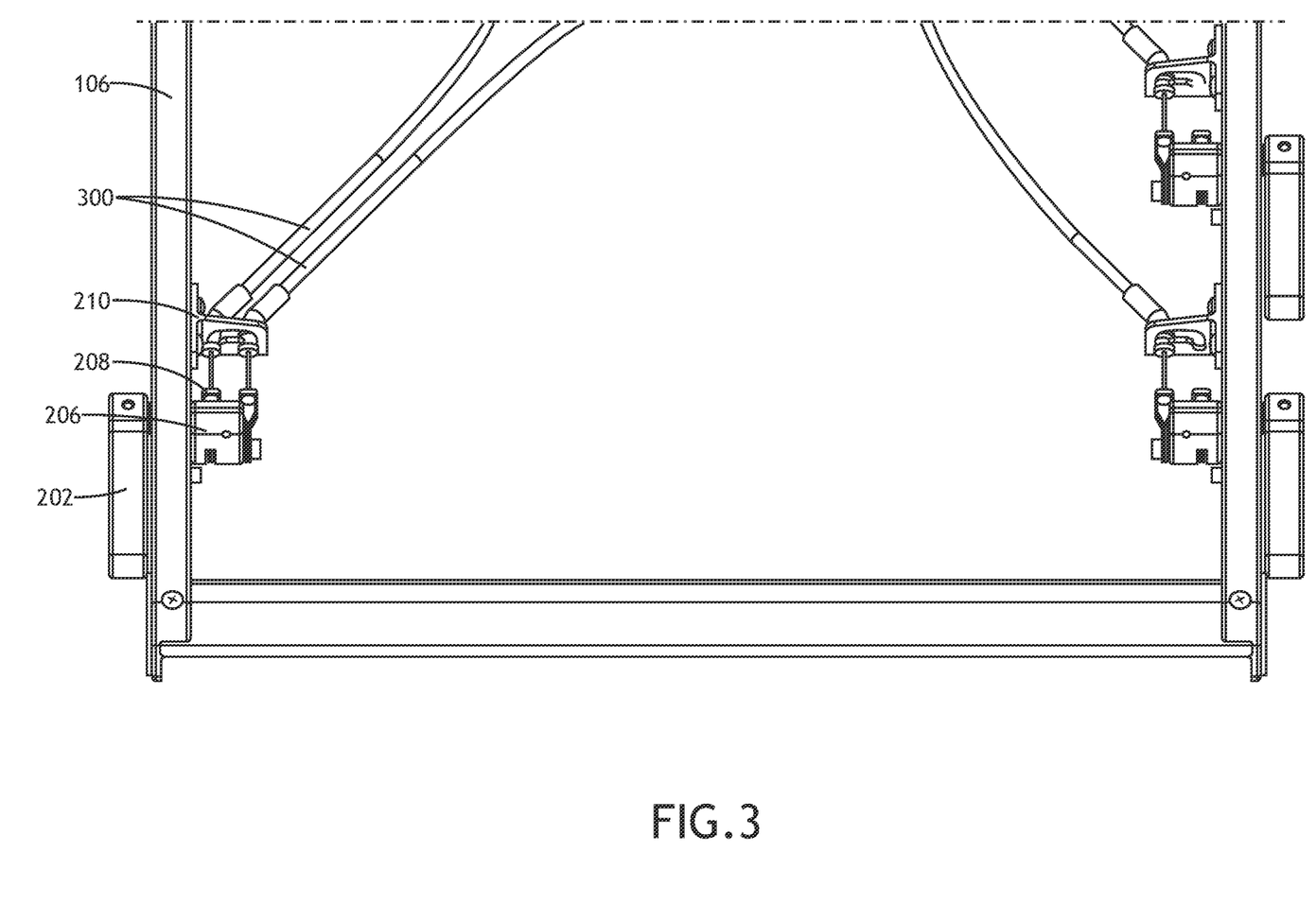
FIG. 3 illustrates a top view of one or more user controlled sub-systems coupled to a seat pan structure of an aircraft seat, in accordance with one or more embodiments of the disclosure.

FIG. 3 illustrates a top view of the one or more user controlled sub-systems coupled to a seat pan structure of the aircraft seat 100, in accordance with one or more embodiments of the disclosure. As seen in FIG. 3, the one or more user controlled sub-systems may include one or more cables 300 attached to the one or more cable end fittings 208. It is noted herein that the number of cable end fittings 208 and cables 300 which are used may correspond to the number of pins that are being pulled by the user controlled sub-system. It is further noted herein that although the figures depict three user controlled sub-systems, the motion control system 200 may include any number and configuration of user controlled sub-systems, thus the figures are provided merely for illustrative purposes.

Figure 4A:
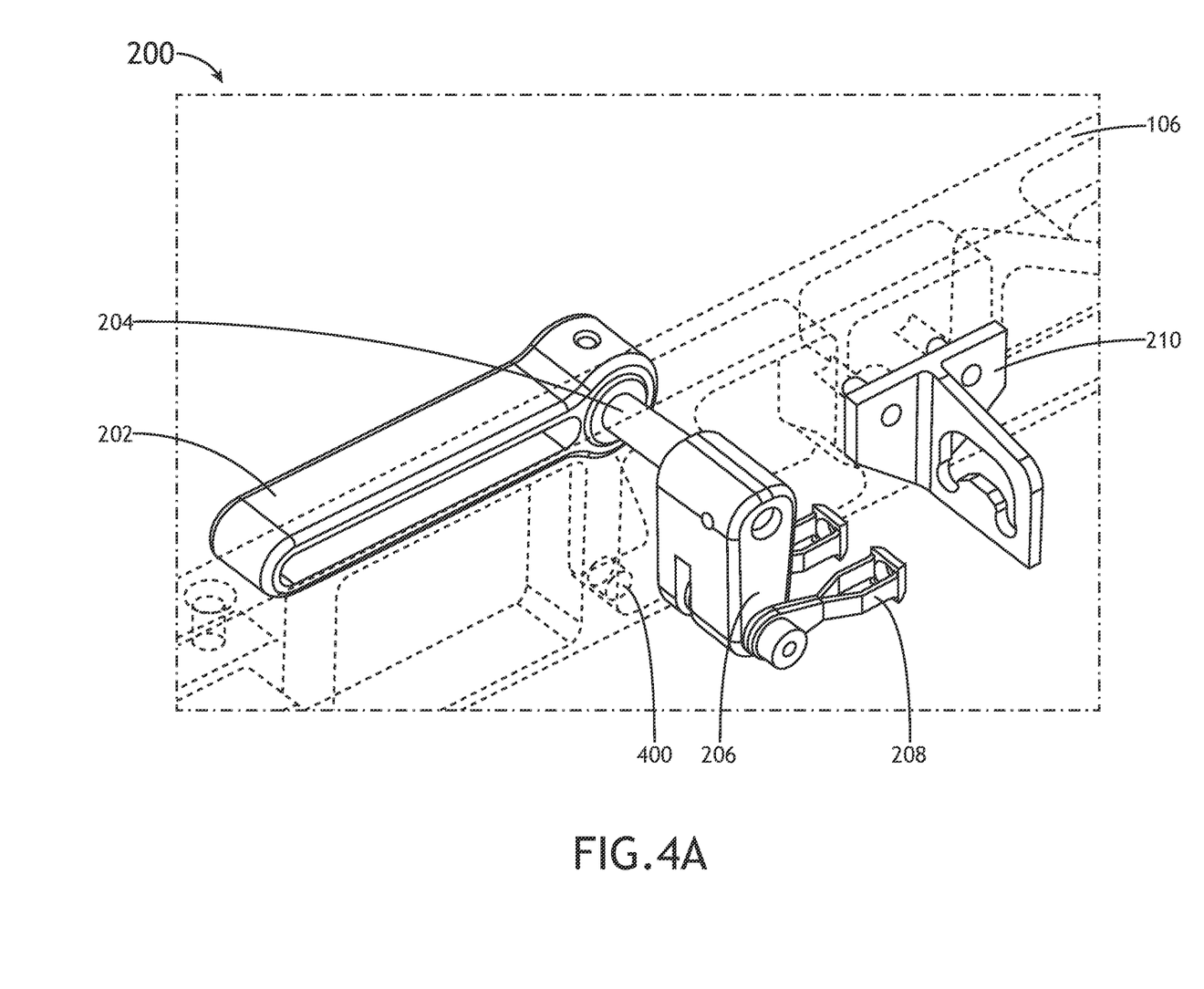
FIG. 4A illustrates a perspective view of a modular user controlled sub-system coupled to a side portion of a seat pan structure of an aircraft seat, in accordance with one or more embodiments of the disclosure.
Figure 4B:
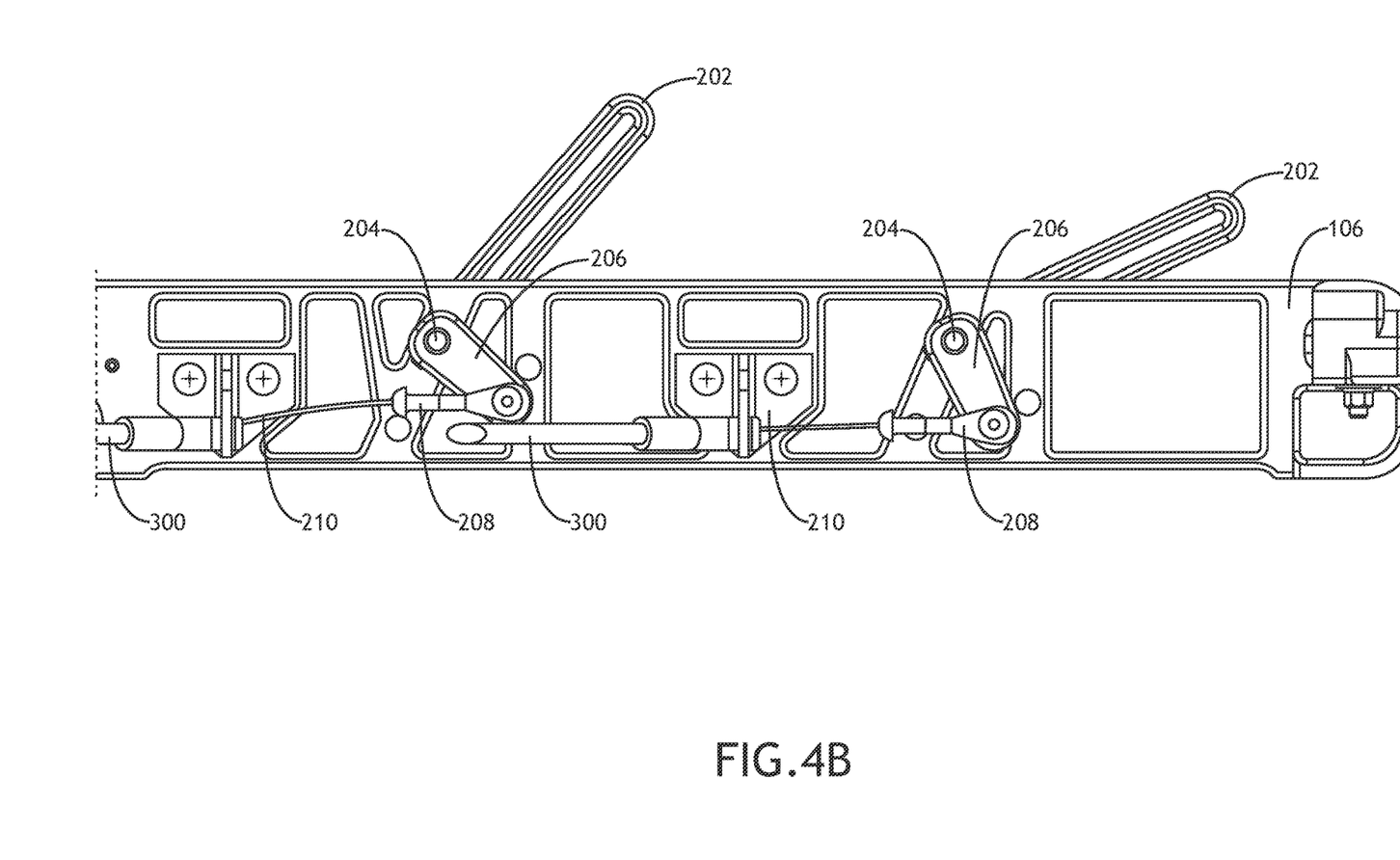
FIG. 4B illustrates a side view of a modular user controlled sub-system coupled to a side portion of a seat pan structure of an aircraft seat, in accordance with one or more embodiments of the disclosure.
Figure 5A:
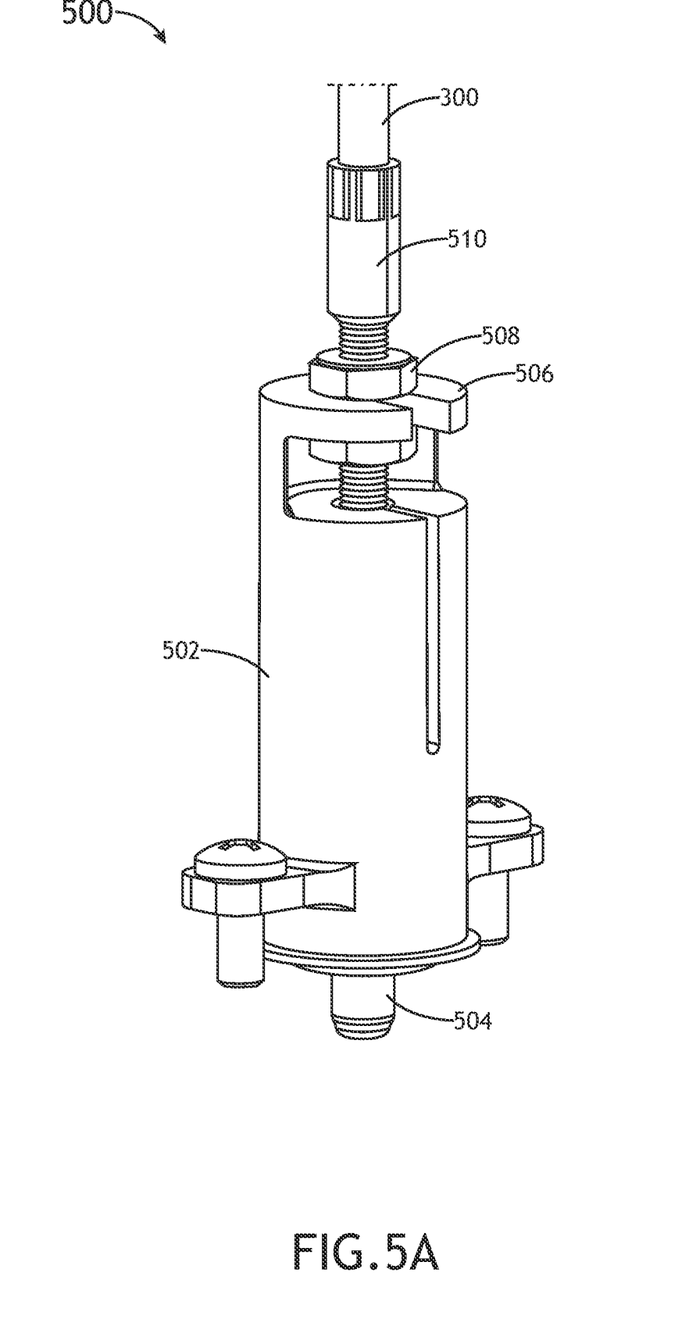
FIG. 5A illustrates a perspective view of a metering pin assembly, in accordance with one or more embodiments of the disclosure.
Figure 5B:
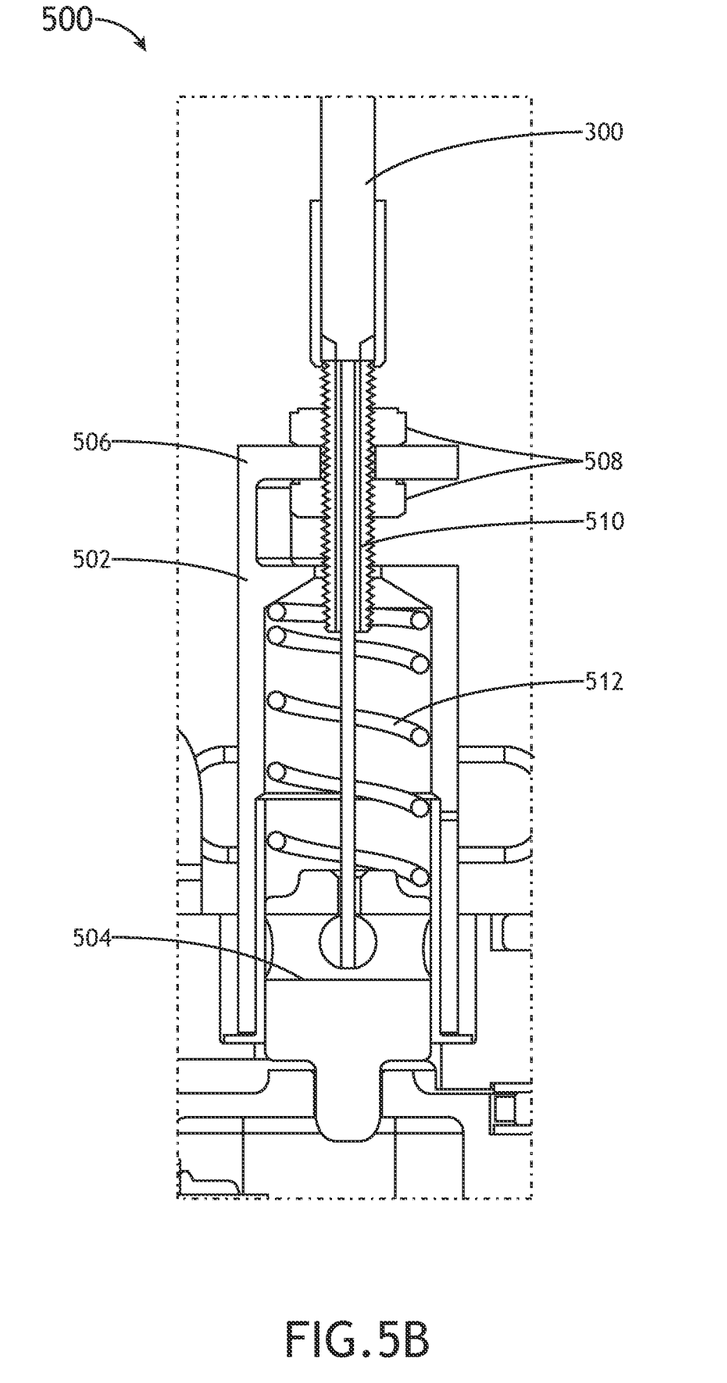
FIG. 5B illustrates a sectional view of a metering pin assembly, in accordance with one or more embodiments of the disclosure.
Figure 6A:
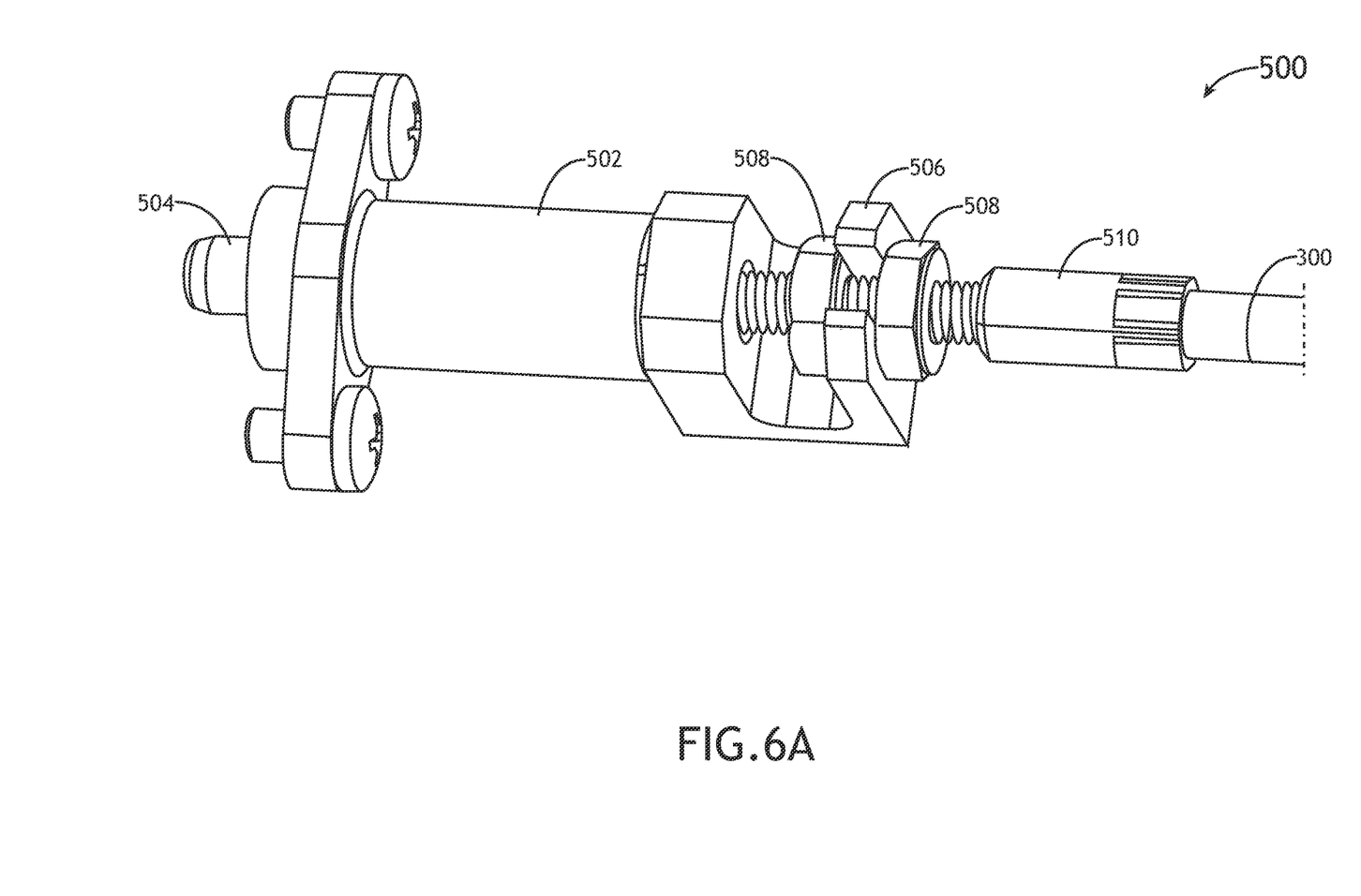
FIG. 6A illustrates a perspective view of a metering pin assembly, in accordance with one or more embodiments of the disclosure.
Figure 6B:
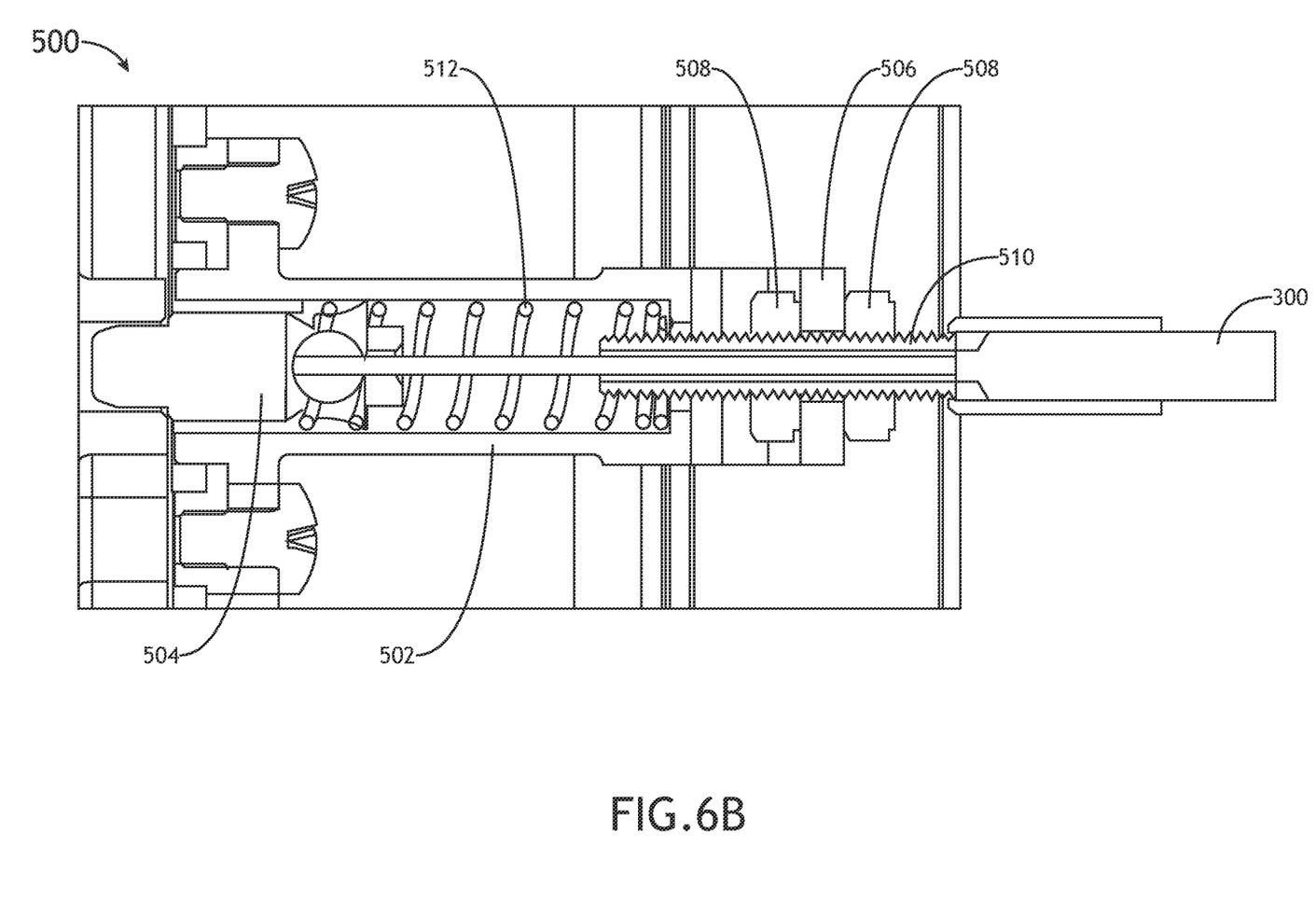
FIG. 6B illustrates a sectional view of a metering pin assembly, in accordance with one or more embodiments of the disclosure.

Referring now to FIGS. 4A and 4B, the one or more user controlled sub-systems may be configured to operate in response to an actuation of the user control device 202 (e.g., handle). In some embodiments, the lever arm 206 may be configured to angularly pivot in response to an actuation of the user control device 202 until obstructed by one or more stops 400 positioned along the swing path of the lever arm 206. For example, the one or more stops 400 may be positioned at one or more locations along the swing path of the lever arm 206 to prevent the metering pin 504 from being pulled more than a predetermined amount of force or a desired length. By way of another example, the lever arm 206 may attach to an end of the one or more cables 300 and transmit a force causing the one or more cables 300 to pull the metering pin 504 of the metering pin assembly 500. The other end of the cable may be coupled to a metering pin 504 of the metering pin assembly 500.

Referring now to FIGS. 5A-6B, a perspective view of the metering pin assembly 500 is illustrated, in accordance with one or more embodiments of the disclosure. In some embodiments, the metering pin assembly 500 may include at least one of a metering pin housing 502, a spring 512, and a metering pin 504.

In some embodiments, the metering pin housing 502 may be configured to include an integrated cable length adjustment feature 506. For example, the metering pin housing 502 may be manufactured to include the adjustment feature 506 such that both the metering pin housing 502 and the cable length adjustment feature 506 are one piece, therefore, preventing separate bracketry and excessive components. In some embodiments, the metering pin housing 502 may house a spring 512 and at least a portion of the metering pin 504. In some embodiments, the metering pin housing 502 may include one or more attachment features which may be used to couple the metering pin assembly 500 to a structure on the aircraft seat 100. For example, the metering pin assembly 500 may be configured to couple to a bottom portion of the seat frame via the one or more attachment features of the metering pin housing 502.

In some embodiments, the metering pin assembly 500 may be configured to couple to the one or more cables 300 via the cable length adjustment feature. The one or more cables 300 may be configured to pass through one or more openings in the metering pin housing 502 and attach to the metering pin 504. For example, an adjustment fitting 510 may be configured to couple to a portion of the one or more cables 300. The adjustment fitting 510 may allow for the one or more cables 300 to adjust to up or down, which will cause the metering pin 504 to move into a desired position. By way of another example, one or more fastening devices 508 (e.g., jam nuts, or the like) may be utilized to either loosen or tighten the one or more cables 300 once they are in a desired position.

Although embodiments of the disclosure are directed to an aviation environment, it is noted herein the track locking system is not limited to use in an aviation environment. Therefore, the above description should not be interpreted as a limitation on the present disclosure but merely an illustration.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A motion control system for an aircraft seat, the motion control system comprising:
   one or more control sub-systems, each control sub-system comprising:
   a user control device;
   a lever arm coupled to the user control device, the lever arm configured to synchronously transmit a force to one or more cables in response to an actuation of the user control device; and
   a metering pin assembly, the metering pin assembly including a metering pin, the metering pin configured to attach to an end portion of the one or more cables and receive a force from the one or more cables causing the respective control sub-system to execute an adjustment control operation.

2. The system of claim 1, wherein the metering pin assembly further comprises:
   a metering pin housing; and
   a spring contained within the metering pin housing, wherein the spring is coupled to the metering pin.

3. The system of claim 2, wherein at least a top portion of the metering pin housing is configured as a cable length adjustment feature.

4. The system of claim 1, further comprising one or more cable fastening assemblies, the one or more cable fastening assemblies comprising:
an adjustment fitting configured to attach to at least a portion of the one or more cables, wherein at least a portion of the adjustment fitting is threaded; and
one or more fasteners configured to couple to the threaded portion of the adjustment fitting, wherein the one or more fasteners are configured to secure the adjustment fitting and one or more cables in place.

5. The system of claim 1, wherein the one or more control sub-systems includes a stop mechanism, wherein the stop mechanism is positioned at a select location along an angular path of the lever arm, wherein the lever arm is configured to rotate along the angular path until it reaches the stop mechanism.

6. The system of claim 1, wherein the one or more control sub-systems includes a vertical adjustment control sub-system configured to allow a user to adjust a vertical position of the aircraft seat.

7. The system of claim 1, wherein the one or more control sub-systems includes a track adjustment control sub-system configured to allow a user to adjust a track position of the aircraft seat.

8. The system of claim 1, wherein the one or more control sub-systems includes a swivel adjustment control sub-system configured to allow a user to adjust a swivel position of the aircraft seat.

9. The system of claim 1, wherein at least one of the one or more control sub-systems are configured to couple to a side portion of the seat pan.

10. The system of claim 1, wherein at least one of the one or more control sub-systems includes one or more interchangeable parts.

11. An aircraft seating system comprising:
an aircraft seat including at least one of a seat frame, seatback structure and a seat pan structure; and
one or more motion control systems, each motion control system comprising:
one or more control sub-systems, each control sub-system comprising:
a user control device;
a lever arm coupled to the user control device, the lever arm configured to synchronously transmit a force to one or more cables in response to an actuation of the user control device; and
a metering pin assembly, the metering pin assembly including a metering pin, the metering pin configured to attach to an end portion of the one or more cables and receive a force from the one or more cables causing the respective control sub-system to execute an adjustment control operation.

12. The system of claim 11, wherein the metering pin assembly further comprises:
a metering pin housing; and
a spring contained within the metering pin housing, wherein the spring is coupled to the metering pin.

13. The system of claim 12, wherein at least a top portion of the metering pin housing is configured as a cable length adjustment feature.

14. The system of claim 11, further comprising one or more cable fastening assemblies, the one or more cable fastening assemblies comprising:
an adjustment fitting configured to attach to at least a portion of the one or more cables, wherein at least a portion of the adjustment fitting is threaded; and
one or more fasteners configured to couple to the threaded portion of the adjustment fitting, wherein the one or more fasteners are configured to secure the adjustment fitting and one or more cables in place.

15. The system of claim 11, wherein the one or more control sub-systems includes a stop mechanism, wherein the stop mechanism is positioned at a select location along an angular path of the lever arm, wherein the lever arm is configured to rotate along the angular path until it reaches the stop mechanism.

16. The system of claim 11, wherein the one or more control sub-systems includes a vertical adjustment control sub-system configured to allow a user to adjust a vertical position of the aircraft seat.

17. The system of claim 11, wherein the one or more control sub-systems includes a track adjustment control sub-system configured to allow a user to adjust a track position of the aircraft seat.

18. The system of claim 11, wherein the one or more control sub-systems includes a swivel adjustment control sub-system configured to allow a user to adjust a swivel position of the aircraft seat.

19. The system of claim 11, wherein at least one of the one or more control sub-systems are configured to couple to a side portion of the seat pan.

20. The system of claim 11, wherein at least one of the one or more control sub-systems includes one or more interchangeable parts.

* * * * *